(12) United States Patent
Barrera-Martinez et al.

(10) Patent No.: US 11,827,063 B2
(45) Date of Patent: Nov. 28, 2023

(54) SERVICEABLE NON-PNEUMATIC TIRE AND WHEEL ASSEMBLIES

(71) Applicant: Ford Global Technologies, LLC, Dearborn, MI (US)

(72) Inventors: Cindy Sofia Barrera-Martinez, Dearborn, MI (US); Janice Lisa Tardiff, Plymouth, MI (US); Vishal Vinayak Nageshkar, Windsor (CA); Adam Wirth, Belleville, MI (US); David Scott Rohweder, Troy, MI (US); Robert Henry Camilleri, Grosse Ile, MI (US); Ryan Buttimer, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/154,193

(22) Filed: Jan. 13, 2023

(65) Prior Publication Data

US 2023/0150310 A1 May 18, 2023

Related U.S. Application Data

(63) Continuation of application No. 16/899,203, filed on Jun. 11, 2020, now Pat. No. 11,577,550.

(60) Provisional application No. 62/861,356, filed on Jun. 14, 2019.

(51) Int. Cl.
*B60C 7/24* (2006.01)
*B60C 7/10* (2006.01)
*B60C 7/14* (2006.01)
*B60B 9/26* (2006.01)
*B60B 9/04* (2006.01)

(52) U.S. Cl.
CPC ............. *B60C 7/24* (2013.01); *B60C 7/107* (2021.08); *B60C 7/146* (2021.08); *B60B 9/04* (2013.01); *B60B 9/26* (2013.01); *B60B 2340/50* (2013.01); *B60B 2900/541* (2013.01); *B60C 7/14* (2013.01)

(58) Field of Classification Search
CPC ........... B60C 7/14; B60C 7/146; B60C 7/107; B60C 7/24; B60C 7/26; B60B 3/041; B60B 3/045; B60B 3/047; B60B 2900/541; B60B 2340/50
See application file for complete search history.

(56) References Cited

U.S. PATENT DOCUMENTS

| | | | | |
|---|---|---|---|---|
| 1,205,882 A | * | 11/1916 | Gadoux | B60B 3/16 301/11.1 |
| 1,353,819 A | * | 9/1920 | Allen | B60B 1/08 301/65 |
| 1,820,882 A | * | 8/1931 | Engstrom | B62D 55/244 474/264 |
| 1,895,241 A | * | 1/1933 | Worley | B62D 55/04 305/152 |
| 2,764,213 A | * | 9/1956 | Simpson | B60C 7/24 152/402 |

(Continued)

*Primary Examiner* — Kip T Kotter
(74) *Attorney, Agent, or Firm* — Burris Law, PLLC

(57) ABSTRACT

A wheel assembly for a non-pneumatic tire includes a wheel including an inboard side, an outboard side, and an outer surface, the outer surface including at least one taper extending from the inboard side to the outboard side, and a locking ring configured to abut against at least one of the inboard side and the outboard side of the wheel and to secure the non-pneumatic tire to the wheel.

18 Claims, 2 Drawing Sheets

(56) References Cited

U.S. PATENT DOCUMENTS

| | | | | |
|---|---|---|---|---|
| 2,882,950 A | * | 4/1959 | Grove | B60C 7/26 |
| | | | | 152/302 |
| 4,235,270 A | * | 11/1980 | Kahaner | B60C 7/10 |
| | | | | 152/326 |
| 2009/0211677 A1 | * | 8/2009 | Palinkas | B60C 7/107 |
| | | | | 157/1.1 |
| 2009/0211681 A1 | * | 8/2009 | Palinkas | B29D 30/02 |
| | | | | 152/326 |
| 2016/0243890 A1 | * | 8/2016 | Nishida | B60C 7/14 |

* cited by examiner

SERVICEABLE NON-PNEUMATIC TIRE AND WHEEL ASSEMBLIES

CROSS-REFERENCE TO RELATED APPLICATIONS

This application is a continuation of U.S. patent application Ser. No. 16/899,203 filed Jun. 11, 2020, which claims priority to and the benefit of U.S. Provisional Application No. 62/861,356 filed Jun. 14, 2019. The disclosures of the above applications are incorporated herein by reference.

FIELD

The present disclosure relates to tires, and more particularly to the design aspects and performance features of non-pneumatic tires.

BACKGROUND

The statements in this section merely provide background information related to the present disclosure and may not constitute prior art.

Non-pneumatic tires are increasingly attractive for the next generation of passenger vehicles. Non-pneumatic tires rely on the use of polymeric spokes rather than compressed gas (e.g., compressed air) to provide support to the vehicle. The polymeric spokes connect a tread of the non-pneumatic tire to a wheel and transfer the load from the ground to the wheel and wheel hub area of a vehicle. Also, current designs rely on adhesives to bond the polymeric spokes to the wheel since the polymeric spokes and the wheel are manufactured from different materials.

The present disclosure addresses the issues of connecting non-pneumatic tires to wheels or wheel hubs, among other issues related to non-pneumatic tires.

SUMMARY

This section provides a general summary of the disclosure and is not a comprehensive disclosure of its full scope or all of its features.

In one form, a wheel for a non-pneumatic tire includes an inboard side, an outboard side, and an outer surface. The outer surface includes at least one taper extending from the inboard side to the outboard side.

In variations of the wheel, which may be implemented individually or in combination: the at least one taper is a single taper extending continuously between the inboard side and the outboard side; the at least one taper is a dual taper with a vertex between a first taper and a second taper; further including a core and an outer flange removably attached to the core, wherein the outer flange includes the at least one taper extending from the inboard side to outboard side.

In another form, a wheel assembly for a non-pneumatic tire includes a wheel including an inboard side, an outboard side, and an outer surface, the outer surface including at least one taper extending from the inboard side to the outboard side and a locking ring configured to abut against at least one of the inboard side and the outboard side of the wheel and to secure the non-pneumatic tire to the wheel.

In variations of the wheel assembly, which may be implemented individually or in combination: the taper of the wheel is a dual taper with a vertex between a first taper and a second taper; the wheel includes a core and an outer flange removably attached to the core, and the outer flange includes the dual tapers with the vertex between the first taper and the second taper; the core and the outer flange are rigidly fastened to each other; the locking ring is integral with the wheel; the locking ring is formed with the wheel in a same casting; the locking ring is welded to the wheel; the locking ring is not integral with the wheel; the at least one taper extends continuously from the inboard side to the outboard side; a diameter of the wheel at the inboard side is greater than a diameter of the wheel at the outboard side; further including a second locking ring configured to abut the other of the inboard side and the outboard side; the locking ring is configured to secure the wheel to an inner liner of the non-pneumatic tire; the locking ring is configured to extend from an inboard side of the non-pneumatic tire to the inboard side of the wheel; the locking ring is configured to extend from an outboard side of the non-pneumatic tire to the outboard side of the wheel.

In another form, a method of serviceably mounting a non-pneumatic tire to a wheel, the non-pneumatic tire comprising an inner liner with a first side, a second side, and at least one taper extending between the first side and the second side, the wheel comprising a core and an outer flange removably attached to the core, the outer flange defining an inboard side, an outboard side, and an outer surface with at least one complementary taper extending between the inboard side and the outboard side, includes removing the core from the outer flange, sliding the inner liner of the non-pneumatic tire onto and across the outer surface of the wheel, and fastening the core to the outer flange.

In variations of the method, which may be implemented individually or in combination: the outer surface the taper of the wheel is a dual taper with a vertex between a first taper and a second taper, and the method further comprises sliding a vertex of the non-pneumatic tire into the vertex of the wheel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
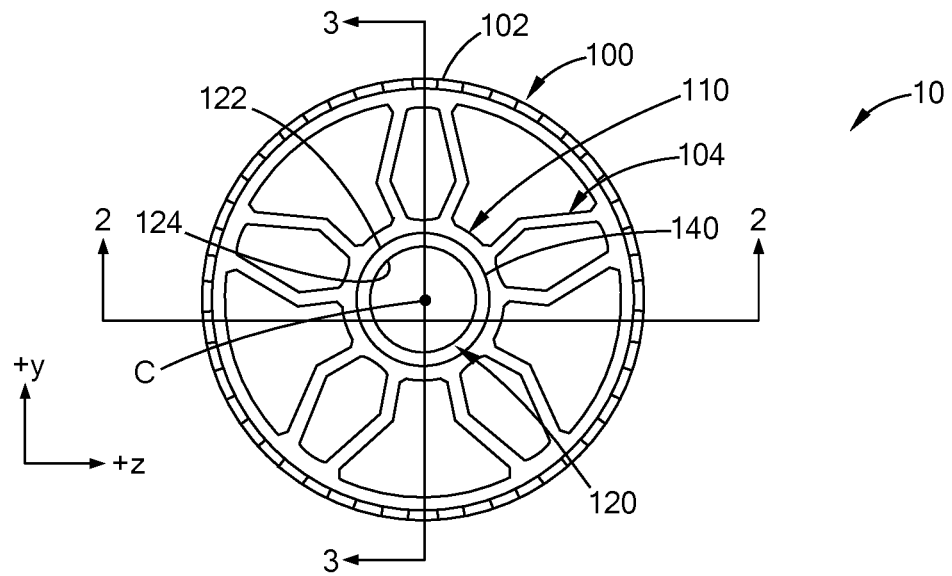
FIG. 1 is a front view of a non-pneumatic tire and wheel assembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
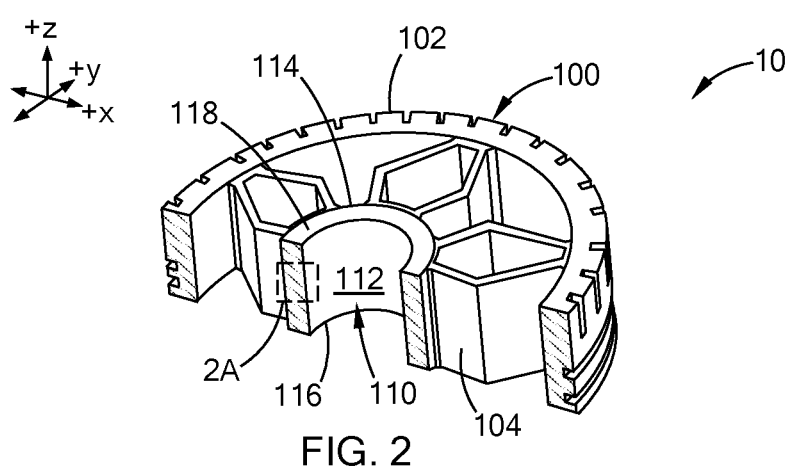
FIG. 2 is a cross-sectional perspective view of the non-pneumatic tire of FIG. 1, taken along section line 2-2 of FIG. 1.

Referring to FIGS. 1 and 2, a tire and wheel assembly 10 according to the teachings of the present disclosure is illustrated. The tire and wheel assembly 10 includes a non-pneumatic tire 100 and a wheel 120. As used herein the term "wheel" refers to a wheel (e.g., a mag wheel or an alloy wheel) or wheel hub. The non-pneumatic tire 100 includes a tread 102, a plurality of spokes 104, and an inner liner 110. The plurality of spokes 104 extend between the tread 102 and the inner liner 110. In some variations of the present disclosure, the plurality of spokes 104 are joined to and provide a mechanical connection between the tread 102 and inner liner 110. The inner liner 110 is defined by an inner surface 112, an outer surface 114, a first side 116 (e.g., an inboard side), and a second side 118 (e.g., an outboard side). The wheel 120 has an outer surface 122 (FIG. 1), an inboard side (not shown) and an outboard side (not shown). In some variations of the present disclosure, the wheel 120 has an inner surface 124. As used herein, the terms "inner", "inward", "outer" and "outward" refer to a radial position or direction relative to a center axis 'C' of the wheel 120 (FIG. 1), and the phrase "inboard side" refers to a side or an object located proximal to a vehicle brake or engine/motor relative to an "outboard side" of the object located distal to the vehicle brake or engine/motor relative to the inboard side.

Figure 2A:
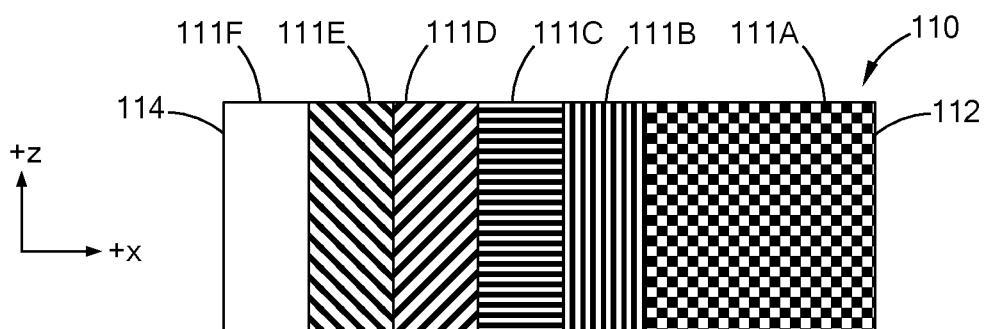
FIG. 2A is an enlarged partial side view of region 2A in FIG. 2, illustrating one or more layers with a different structure and/or material, according to the teachings of the present disclosure.

Referring now to FIG. 2A, an enlarged view of a portion '2A' of the inner liner 110 of the non-pneumatic tire 100 is shown. In one form of the present disclosure, the inner liner 110 includes one or more concentric layers that have different characteristics such as different structures, different materials, among others. For example, FIG. 2A depicts the inner liner 110 with a section or layer 111A comprising fibers or a ply of fibers in a first orientation (e.g., a stackup orientation), a layer 111B with fibers or a ply of fibers in a second orientation, a layer 111C with fibers or a ply of fibers in a third orientation, a layer 111D with fibers or a ply of fibers in a fourth orientation, a layer 111E with fibers or with fibers or a ply in a fifth orientation, and any additional layer(s) 111F that may be included in order to provide a desired set of mechanical properties. It should be understood that the layers of the inner liner 110 include materials, fibers, plies, and the like such that desired properties of the inner liner 110 are provided. Non-limiting examples of desired properties include strength, ductility, stiffness, friction coefficient, corrosion resistance, among others. In another form of the present disclosure, the tread 102 and the inner liner 110 are made from an elastomeric material and the plurality of spokes are made from a polymeric material. Non-limiting examples of materials used to make the inner liner 110 include reinforced elastomers such as Styrene-butadiene rubber (SBR), butadiene rubber (BR), natural rubber (NR), ethylene propylene diene monomer (EPDM), butyl rubber, chloro-butyl rubber, bromo-butyl rubber, thermoplastic elastomer (TPE), and functionalized versions of all of the previously named rubber polymers. These materials may be reinforced with nylon, polyester, aramid, steel, glass fiber, carbon fiber or other reinforcement material(s). Also, the plurality of spokes 104 in one form are joined to the tread 102 and the inner liner 110 using known methods or techniques such as adhesives and the like. Also, the plurality of spokes 104 can be molded and/or 3D printed onto or as part of the tread 102 and/or inner liner 110.

The inner diameter and properties of the inner liner 110 provide a secure and removable mounting of the tread 102 and plurality of spokes 104 to the wheel 120. For example, in one form of the present disclosure, the inner liner 110 and wheel 120 have an interference fit therebetween such that after the inner liner 110 is disposed onto the wheel 120, with or without use of an adhesive 140, the non-pneumatic tire 110 does not rotate relative to the wheel 120 during operation or use of the tire and wheel assembly 10. Accordingly, the inner liner 110 is disposed on the wheel 120 such that the non-pneumatic tire 100 is serviceably mounted to the wheel 120. As used herein, the phrase "serviceably mounted" refers to being securely and removably mounted or attached to an object. That is, the non-pneumatic tire 100 can be mounted to the wheel 120, removed, mounted onto the wheel 120 again, replaced with another non-pneumatic tire 100, and the like, for example with a conventional pry bar/mechanism. In this manner, a vehicle with the tire and wheel assembly 10 can drive along a road, drive in traffic, among others, until inspection, repair, and/or replacement of the non-pneumatic tire 100 is desired and performed.

Figure 3A:
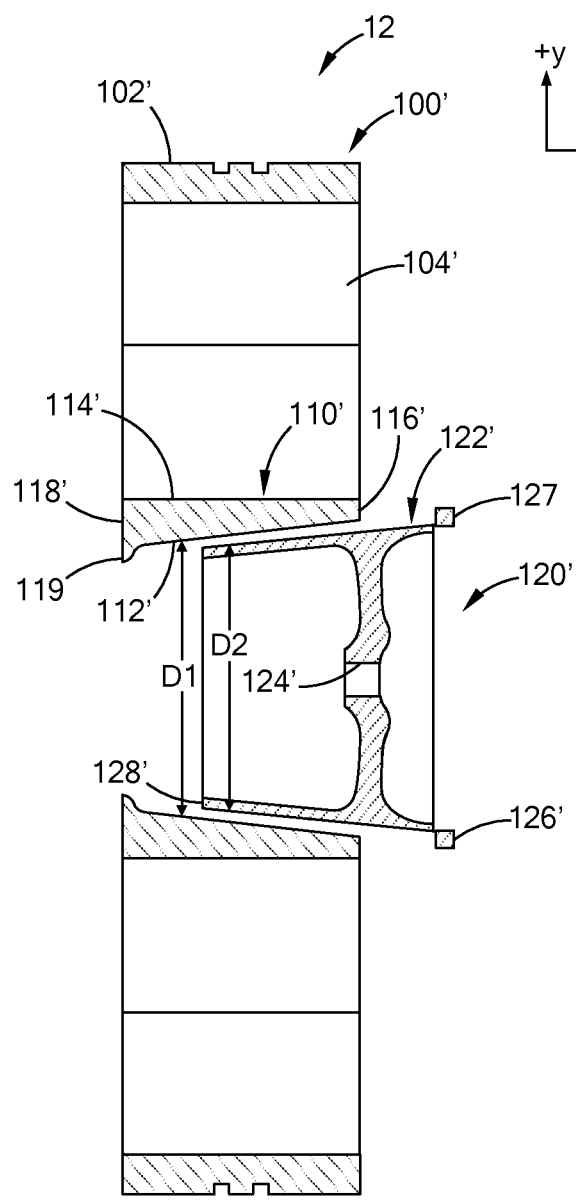
FIG. 3A is a cross sectional view, taken along section line 3-3 in FIG. 1, illustrating another form of a tire and wheel assembly, according to the teachings of the present disclosure.

Referring now to FIG. 3A, in one form of the present disclosure, a tire and wheel assembly 12 includes the non-pneumatic tire 100' and the wheel 120' with the inner liner 110', and the inner liner 110' has a taper between the first side 116' and the second side 118'. Also, the wheel outer surface 122' has a complementary taper between an inboard side 126' and an outboard side 128'. That is, a diameter 'D1' of the inner surface 112' of the inner liner 110' and a complementary diameter 'D2' of the outer surface 122' of the wheel 120' both change with distance along the center axis C (z-direction) as shown in the figures. As shown in FIG. 3A, the non-pneumatic tire 100' has a single taper between the first side 116' and second side 118', and the wheel 120' has a single taper between an inboard side 126' and an outboard side 128'. That is, the diameters of the inner surface 112' and the outer surface 122' increase continuously in the +z direction.

In one form of the present disclosure, one side (e.g., the second side 118') of the inner liner 110' includes a wheel flange 119 extending inwardly from the inner liner 110'. The wheel flange 119 bounds or abuts against a side (e.g., the outboard side 128') of the wheel 120' when the non-pneumatic tire 100' is serviceably mounted on the wheel 120'. In the alternative, or in addition to, a side (e.g., the inboard side 126') of the wheel 120' includes a locking ring 127 as shown in FIG. 3A that locks the wheel 120' within the inner liner 110'. It should be understood that the locking ring 127 locks the wheel 120' within the inner liner 110' by fastening to the inner liner 110' and/or fastening to the inner liner 110' and the wheel 120'. That is, in some variations, the locking ring 127 is integral with the wheel 120'. While in other variations, the locking ring 127 is not integral with the wheel 120'. Also, the locking ring 127 can fasten to the inner liner 110' and/or the wheel 120' using known fastening techniques such as threaded fasters, adhesives (not labeled), slotted apertures (not shown) and locking pins (not shown), among others. As used herein, the term "integral" refers to a part or feature that permanently attached another part. Non-limiting examples of the locking ring 127 being integral with the wheel 120' include the locking ring 127 and the wheel 120' being formed from the same casting, and the locking ring 127 being welded to the wheel 120'. While not shown in FIG. 3A, it should be understood that the wheel flange 119 can be replaced with a locking ring 127. For example, in some variations, the tire and wheel assembly 12 includes a first locking ring configured to abut against the inboard side 126' of the wheel 120' and the first side 116' of the inner liner 110', and a second locking ring configured to abut against the outboard side 128' of the wheel 120' and the second side 118' of the inner liner 110'.

During servicing of the tire and wheel assembly 12, the locking ring 127 is removed or unfastened from the inner liner 110' and/or wheel 120' and the non-pneumatic tire 100' is removed from the wheel 120', for example by pulling the non-pneumatic tire 100' in the −z direction shown in FIG. 3A. The same non-pneumatic tire 100', or another non-pneumatic tire (not shown), is then serviceably mounted onto the wheel 120', for example by pushing the inner liner 110' in the +z direction until the wheel flange 119 abuts against the outboard side 128' and fastening the locking ring 127 to the inner liner 110' and/or the wheel 120'.

Figure 3B:
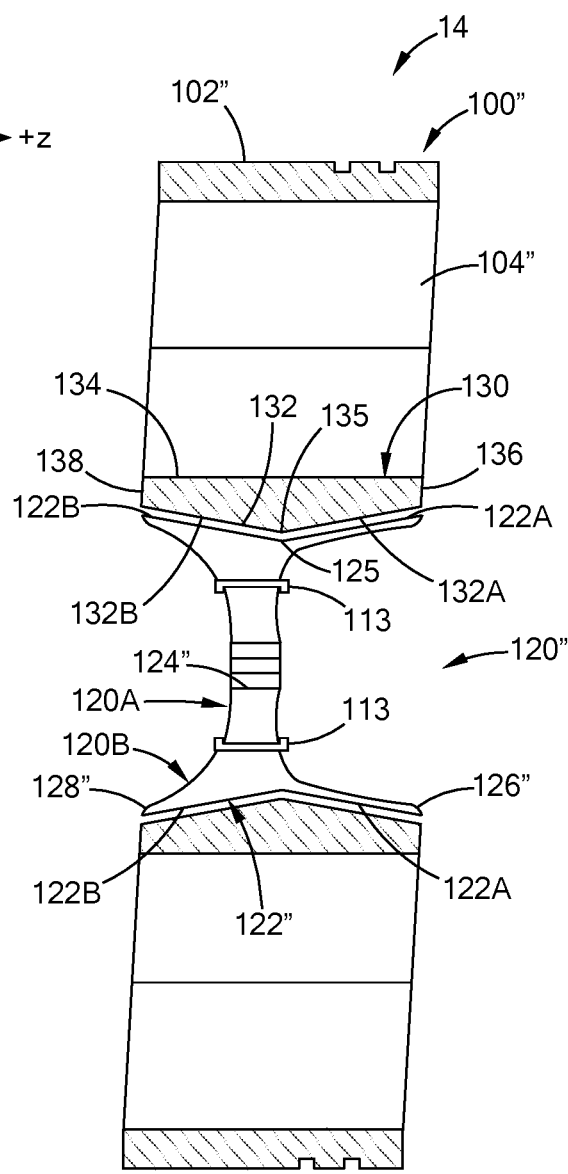
FIG. 3B is another cross-sectional view, taken along section line 3-3 in FIG. 1, illustrating still another form of a tire and wheel assembly, according to the teachings of the present disclosure.

Referring now to FIG. 3B, in another form of the present disclosure, a tire and wheel assembly 14 includes the non-pneumatic tire 100", the wheel 120" with an inner liner 130, and dual tapers between the non-pneumatic tire 100" and the wheel 120". Particularly, an inner surface 132 of the inner liner 130 has a first taper 132A and a second taper 132B between a first side 136 and a second side 138, and the wheel outer surface 122" has a complementary first taper 122A and a complementary second taper 122B between an inboard side 126" and an outboard side 128". That is, diameters (not labeled) of the inner surface 132 of the inner liner 130 and the outer surface 122" of the wheel 120" decrease and then increase with distance along the z direction as shown in FIG. 3B. For example, the diameters of the inner surface 132 and the outer surface 122 can decrease continuously in the +z direction until reaching a vertex 135, 125, respectively, and then increase continuously in the +z direction until reaching the first side 136 and inboard side 126", respectively. In some variations of the present disclosure, a wheel flange and a locking ring are not included in the tire and wheel assembly 14 and the inner liner 130 is centered and serviceably mounted onto the wheel 120" via the dual tapers, a friction fit and/or an adhesive. In other variations, a wheel flange and/or a locking ring(s) can be included as described above with respect to FIG. 3A.

Still referring to FIG. 3B, in one form of the present disclosure, the wheel 120" with the dual tapers 122A, 122B is made from an inner part or core 120A and an outer flange 120B, and the outer flange 120B includes the dual tapers 122A, 122B. In the example shown in FIG. 3B, the inboard side 126" is a side of the outer flange 120B that is furthest in an inboard direction of the wheel 120" and forms a continuous inboard edge with the outer surface 122", the inboard edge extending about a complete inboard circumference of the wheel 120". In the example of FIG. 3B, the outboard side 128" is a side of the outer flange 120B that is furthest in the outboard direction of the wheel 120" and forms a continuous outboard edge with the outer surface 122", the outboard edge extending about a complete outboard circumference of the wheel 120". The core 120A is rigidly attached to the outer flange 120B using fasteners, joining techniques, and the like. For example, the core 120A can be rigidly attached to the outer flange 120B using one or more threaded fasteners 113. It should be understood that making the wheel 120" from more than one part can enhance manufacturing of the wheel 120", enhance designing the wheel 120", among others.

During servicing of the tire and wheel assemblies 10, 12, 14, the non-pneumatic tire 100, 100', 100" is removed from the wheel 120, 120', 120" for example by using a tire changing machine (not shown) with a lever that pries and/or pulls the non-pneumatic tire 100, 100', 100" in the +z or −z direction shown in FIGS. 3A, 3B. The same non-pneumatic tire 100, 100', 100", or another non-pneumatic tire (not shown), is then serviceably mounted onto the wheel 120, for example by using the same tire changing machine and pushing the inner liner 110 in the −z or +z direction until the inner liner 110 is positioned on the wheel 120. In at least one example, removing the non-pneumatic tire 100' from the wheel 120' of the tire and wheel assembly 12 can include removing and/or unfastening the locking ring 127 from the inner liner 110' and/or wheel 120' and sliding the inner liner 110' off the wheel 120' (−z direction) such that the non-pneumatic tire 100' can be repaired, inspected, among others. Then, the same non-pneumatic tire 100' or another non-pneumatic tire 100' is mounted onto the wheel 120' by sliding the inner liner 110' onto the wheel 120' (+z direction) until the wheel flange 119 of the inner liner 110' abuts against the outboard side 128' of the wheel 120'. Then, the locking ring 127 is fastened to the wheel 120' such that sliding of the inner liner 110' relative to the wheel 120' is inhibited.

In at least one other example, removing the non-pneumatic tire 100" from the wheel 120" of the tire and wheel assembly 14 can include sliding the inner liner 130 off the wheel 120" (−z direction) such that the non-pneumatic tire 100" can be repaired, inspected, among others. Then, the same non-pneumatic tire 100" or another non-pneumatic tire 100" is mounted onto the wheel 120" by sliding the inner liner 130 onto the wheel 120" (+z direction) until the vertex 135 is aligned with or nested within the vertex 125 as shown in FIG. 3B and sliding of the inner liner 130 relative to the wheel 120" is inhibited. In some variations, one or more locking rings (e.g., one or more locking rings 127) are included and enhance mounting of the non-pneumatic tire 100" to the wheel 120". In such variations, the one or more locking rings are removed and/or unfastened before sliding the inner liner 130 off the wheel 120" and re-fastened to the wheel 120" after mounting the same non-pneumatic tire 100" or another non-pneumatic tire 100" onto the wheel 120". Also, in at least one variation, the wheel 120" with the dual tapers (i.e., first taper 132A and second taper 132B) is made from the inner part or core 120A and the outer flange 120B with the dual tapers 132A, 132B. In such a variation, the core 120A can be removed from the outer flange 120B before, during and/or after the sliding the inner liner 130 off the wheel 120" and re-attached to the outer flange 120B before, during and/or after the sliding the inner liner 130 onto the wheel 120". For example, removing the core 120A from the outer flange 120B before sliding the inner liner 130 off the wheel 120" can result in an increase in flexibility or elastic deformation of the outer flange 120B during sliding of the inner liner 130 off the outer flange 120B. Similarly, re-attaching the core 120A to the outer flange 120B after sliding the inner liner 130 onto the wheel 120" can result in an increase in flexibility or elastic deformation of the outer flange 120B during sliding of the inner liner 130 onto the outer flange 120B.

While the inner liner and wheel discussed above have been described in relation to non-pneumatic tires, it should by understood that such parts, aspects, features, techniques and the like may be employed with other types of tires and the present disclosure is not necessarily limited to non-pneumatic tires.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of serviceably mounting a non-pneumatic tire to a wheel, the non-pneumatic tire comprising an inner liner with a first side, a second side, and at least one taper extending between the first side and the second side, the wheel comprising a core and an outer flange removably attached to the core, the outer flange defining an inboard side, an outboard side, and an outer surface with at least one complementary taper extending between the inboard side and the outboard side, wherein the method comprises:
removing the core from the outer flange;
elastically deforming the outer flange while sliding the inner liner of the non-pneumatic tire onto and across the outer surface of the outer flange; and
fastening the core to the outer flange after the inner liner of the non-pneumatic tire is slid onto and across the outer surface of the outer flange.

2. The method of claim 1, wherein the at least one complementary taper is a dual taper with first taper and a second taper that meet at a vertex of the outer flange that is radially inward of the inboard side and the outboard side, and the method further comprises sliding a vertex of the non-pneumatic tire into the vertex of the outer flange.

3. A method of serviceably mounting a non-pneumatic tire to a wheel, the non-pneumatic tire comprising an inner liner with a first side, a second side, and a dual taper extending between the first side and the second side, the wheel comprising a one-piece outer flange, the outer flange defining an inboard side, an outboard side, and an outer surface with a complementary dual taper extending between the inboard side and the outboard side, the dual taper including a first taper and a second taper that meet at a vertex of the outer flange that is radially inward of the inboard side and the outboard side, wherein the method comprises:
sliding the inner liner of the non-pneumatic tire onto the outer surface of the outer flange and across the first taper toward the second taper until a vertex of the non-pneumatic tire slides into the vertex of the outer flange so that the dual taper of the non-pneumatic tire nests in the complementary dual taper of the outer surface of the outer flange.

4. The method according to claim 3, wherein the inboard side is a side of the outer flange that is furthest in an inboard direction of the wheel and forms a continuous inboard edge with the outer surface, the inboard edge extending about a complete inboard circumference of the wheel, the outboard side being a side of the outer flange that is furthest in an outboard direction of the wheel and forms a continuous outboard edge with the outer surface, the outboard edge extending about a complete outboard circumference of the wheel.

5. The method of claim 4, wherein the wheel further comprises a core removably attached to the outer flange.

6. The method of claim 4, wherein the wheel further comprises:
a locking ring configured to abut against at least one of the inboard side and the outboard side of the wheel and to secure the non-pneumatic tire to the wheel.

7. The method of claim 6, wherein the locking ring is integral with the outer flange.

8. The method of claim 7, wherein the locking ring is formed with the outer flange in a same casting.

9. The method of claim 7, wherein the locking ring is welded to the outer flange.

10. The method of claim 6, wherein the locking ring is not integral with the outer flange.

11. The method of claim 6, wherein the dual taper extends continuously from the inboard side to the outboard side.

12. The method of claim 6, wherein a diameter of the wheel at the inboard side is greater than a diameter of the wheel at the outboard side.

13. The method of claim 6, wherein the wheel further comprises a second locking ring configured to abut the other of the inboard side and the outboard side.

14. The method of claim 6, wherein the locking ring is configured to secure the outer flange to the inner liner of the non-pneumatic tire.

15. The method of claim 14, wherein the locking ring is configured to extend from an inboard side of the non-pneumatic tire to the inboard side of the outer flange.

16. The method of claim 14, wherein the locking ring is configured to extend from an outboard side of the non-pneumatic tire to the outboard side of the outer flange.

17. The method of claim 3, wherein the wheel comprises a core removably attached to the outer flange.

18. The method of claim 17, wherein the core and the outer flange are rigidly fastened to each other.

* * * * *